US012065994B2

(12) United States Patent
Shipman et al.

(10) Patent No.: US 12,065,994 B2
(45) Date of Patent: Aug. 20, 2024

(54) WORK MACHINE WITH DIRECTIONAL AIR INTAKE ASSEMBLY (71) Applicant: Caterpillar Inc., Peoria, IL (US)

(72) Inventors: Cody C Shipman, Raleigh, NC (US); Nagaraju Manchikanti, Cary, NC (US); William C Martin, Stillwater, OK (US); Terril Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 454 days.

(21) Appl. No.: 17/391,879

(22) Filed: Aug. 2, 2021

(65) Prior Publication Data
US 2023/0030215 A1 Feb. 2, 2023

(51) Int. Cl.
F02M 35/10 (2006.01)
E02F 9/08 (2006.01)
(Continued)

(52) U.S. Cl.
CPC ..... *F02M 35/10013* (2013.01); *E02F 9/0866* (2013.01); *E02F 9/163* (2013.01);
(Continued)

(58) Field of Classification Search
CPC ............ F02M 35/10013; F02M 35/164; E02F 9/0866; E02F 9/163; F01N 13/002; F01N 2340/04; F01N 2590/08
See application file for complete search history.

(56) References Cited

U.S. PATENT DOCUMENTS 6,092,616 A * 7/2000 Burris ................... B60K 11/08
180/68.1
7,861,814 B2 * 1/2011 Hageman ......... F02M 35/10013
180/68.1
(Continued)

FOREIGN PATENT DOCUMENTS

JP 2006-028873 A 2/2006

OTHER PUBLICATIONS

Engine Air Filtration for Light, Medium & Heavy Dust Conditions, Donaldson Filtration Solutions, Catalog No. F10027 (3/13), 9 pages, retrieved Jun. 16, 2021 from http://donaldsonoemfiltration.com/library/files/documents/pdfs/061238.pdf.
(Continued)

*Primary Examiner* — Jacob B Meyer (57) ABSTRACT

A work machine, such as a skid steer loader or a compact track loader, includes a directional air intake assembly with a directional cap positioned on an intake pipe for selectively drawing ambient air into an internal combustion engine. A cooling vent ejects air heated by a rear-mounted engine upwardly into the atmosphere. Extending higher than and adjacent to the cooling vent, the directional cap has an elongated head that blocks ingress to the intake pipe other than through an opening at a face of the cap. Selectively positioning and angling the opening between a side of the loader and an edge of the cooling vent avoids taking in debris from near the wheels or tracks, avoids taking in heated air from the cooling vent, and takes advantage of negative pressure caused by the updraft from the cooling vent to remove particulates, resulting in cleaner air for the engine at close to ambient temperature.

20 Claims, 6 Drawing Sheets (51) Int. Cl.
  *E02F 9/16* (2006.01)
  *F01N 13/00* (2010.01)
  *F02M 35/16* (2006.01)
(52) U.S. Cl.
  CPC ......... *F01N 13/002* (2013.01); *F02M 35/164* (2013.01); *F01N 2340/04* (2013.01); *F01N 2590/08* (2013.01)

(56) References Cited

U.S. PATENT DOCUMENTS

| | | | | |
|---|---|---|---|---|
| 8,556,014 | B2* | 10/2013 | Smith | B60K 11/04 180/68.1 |
| 8,833,500 | B2* | 9/2014 | Nakamura | E02F 9/0866 180/69.2 |
| 8,857,547 | B1* | 10/2014 | Shiina | F02M 35/088 180/68.3 |
| 9,010,094 | B2* | 4/2015 | O'Neil | F02D 41/08 60/285 |
| 9,487,079 | B2* | 11/2016 | Kelley | F02M 35/161 |
| 9,909,543 | B2* | 3/2018 | Gomez | F02M 35/10013 |
| 9,957,929 | B2* | 5/2018 | Zeilenga | B01D 46/442 |
| 2009/0229685 | A1* | 9/2009 | Hageman | F02M 35/024 137/544 |
| 2014/0138066 | A1* | 5/2014 | Bibb, III | F28F 9/002 165/121 |
| 2021/0115884 | A1* | 4/2021 | Ketterhagen | F02M 35/08 |
| 2023/0030215 | A1* | 2/2023 | Shipman | B60K 13/02 |

OTHER PUBLICATIONS

Written Opinion and International Search Report for Int'l. Patent Appln. No. PCT/US2022/038276, mailed Nov. 17, 2022 (12 pgs).

* cited by examiner

WORK MACHINE WITH DIRECTIONAL AIR INTAKE ASSEMBLY

TECHNICAL FIELD

The present disclosure relates to a work machine having a directional air intake assembly. More specifically, the present disclosure relates to a compact loader having an air intake assembly with a directional cap, and a method for directing ambient air through the assembly and into an internal combustion engine of the compact loader.

BACKGROUND

Compact loaders, such as skid steer loaders or compact track loaders, are relatively small work machines that can provide a variety of lifting and moving functions in tight spaces. Well balanced and highly maneuverable, compact loaders often are used in rugged outdoor environments, such as with heavy construction or mining. A compact loader typically has an operator cab centered or somewhat forward on a frame, lift arms that pivot on left and right sides of the frame, and a work tool such as a shovel manipulated by the lift arms. Wheels or tracks that may be separately driven, combined with the relatively small size of the loader, contribute to the high maneuverability of the machine. An internal combustion engine mounted in a compartment behind the operator cab powers the loader and provides a counterbalance to a load on the work tool in front.

The engines on compact loaders can generate and emit significant heat. Cooling systems extract heat from the engines with drawn or forced air and exhaust the air at high temperatures into the environment around the engines. Often the heated air is exhausted upwardly through a vent or grille that covers a substantial area of a rear surface on the machine behind the operator cab. In addition, regenerators for particulate filters on diesel engines can separately discharge air around the engines at even higher temperatures. The engines on compact loaders, however, require the intake of comparatively cool air for efficient combustion. For example, some manufacturers of engines for compact loaders require that air entering the engine be no more than 5 degrees Celsius above ambient temperature. In part to avoid taking in heated air emitted above the engine from the exhaust sources, compact loaders typically take in air for their engines away from those locations, such as at a side of the machines just above the wheels or tracks.

The air drawn into the engines for combustion, however, must also be relatively free of particulates. Dirty air can adversely affect engine performance. As air is drawn into the engines, filters may help block the passage of some particulates, but the dirty or dusty environments in which compact loaders often work can saturate the filters and be hazardous to their engines. Taking in air from near the wheels or tracks, in particular, can cause a large quantity of particulates to be caught in filters. The air filters then need to be serviced frequently, causing an increase in cost for replacement filters, expense for the labor of servicing, and lost time operating in the field for the machines.

One approach for decreasing particulates within the intake air of a work machine is described in U.S. Pat. No. 9,957,929 ("the '929 patent"). The '929 patent describes a cylindrical air intake duct located on the hood of a work machine, such as an agricultural tractor. The duct has an inlet covered by a filtering screen on one side of the cylinder and includes a particulate sensor. Other particulate sensors may be located elsewhere on the tractor. Based on detections from the particulate sensors, a controller causes actuators to reposition the duct to receive cleaner air, by rotating the duct or moving it upwards or downwards. The system described in the '929 patent, however, does not account for the temperature of air drawn into its engine, nor is the intake duct suitable for installation on a compact machine having flows of high-temperature air above its engine. The system of the '929 patent also requires the addition of particulate sensors, control electronics, drive gears, and reversible electric motors, all of which may be costly, complicated, and error-prone when operating in rugged work environments. As a result, the system of the '929 patent is not desirable for use on compact loaders or other work machines.

Examples of the present disclosure are directed to overcoming deficiencies of such systems.

SUMMARY

In an aspect of the present disclosure, a machine includes a frame, an engine compartment located in a rear section of the frame, an internal combustion engine mounted within the engine compartment, a cooling vent configured to eject air heated by the engine upwardly from the engine compartment into atmosphere, and an intake pipe at least partially within the engine compartment. The intake pipe is configured to pass ambient air from a distal end of the intake pipe into the engine. The machine further includes a directional intake cap having sides enclosing an elongated cavity between an inlet opening and an outlet opening. The inlet opening is configured to take in the ambient air for the engine, and the outlet opening is coupled to the distal end of the intake pipe. The directional intake cap is rotationally oriented on the intake pipe in a position such that, with respect to a longitudinal axis of the machine, the inlet opening is vertically over at least a portion of a top outer surface of the engine compartment and laterally aside the cooling vent. In addition, the directional intake cap is positioned so that at least one of the sides of the directional intake cap is between the elongated cavity and the heated air ejected upwardly by the cooling vent.

In another aspect of the present disclosure, a method for operating an internal combustion engine on a mobile machine includes drawing cooling air into an engine compartment in a rear of the mobile machine, where the engine compartment includes two sidewalls disposed horizontally apart, causing a transfer of heat from the internal combustion engine to form heated air, and exhausting the heated air from the mobile machine through a grating situated within an exterior surface of the engine compartment between the two sidewalls. The method further includes drawing ambient air for the internal combustion engine into an opening of a directional intake apparatus and then through a passage in the exterior surface of the engine compartment. The ambient air is drawn in from a location on the rear of the mobile machine lateral to a longitudinal centerline of the machine between the grating and one of the sidewalls.

In yet another aspect of the present disclosure, a compact loader has a cab configured to seat an operator, an internal combustion engine mounted in a rear of the compact loader behind the cab, a cooling package having a grating exposed to atmosphere and configured to eject a flow of air heated by the engine upwardly through the grating into the atmosphere. The compact loader further includes an air intake assembly located adjacent the cooling package and configured to pass ambient air into the engine. The air intake assembly has an inlet tube coupled to the engine and a directional cap coupled to the inlet tube. The directional cap has a substantially tubular elongated body with a front edge defining an orifice. The orifice is at a position transversely beside the grating on the outer surface of the compact loader. The substantially tubular elongated body of the directional cap surrounds a central axis that passes through the orifice and, as the directional cap is positioned on the compact loader, in a direction rearward from the cab.

DETAILED DESCRIPTION

Figure 1:
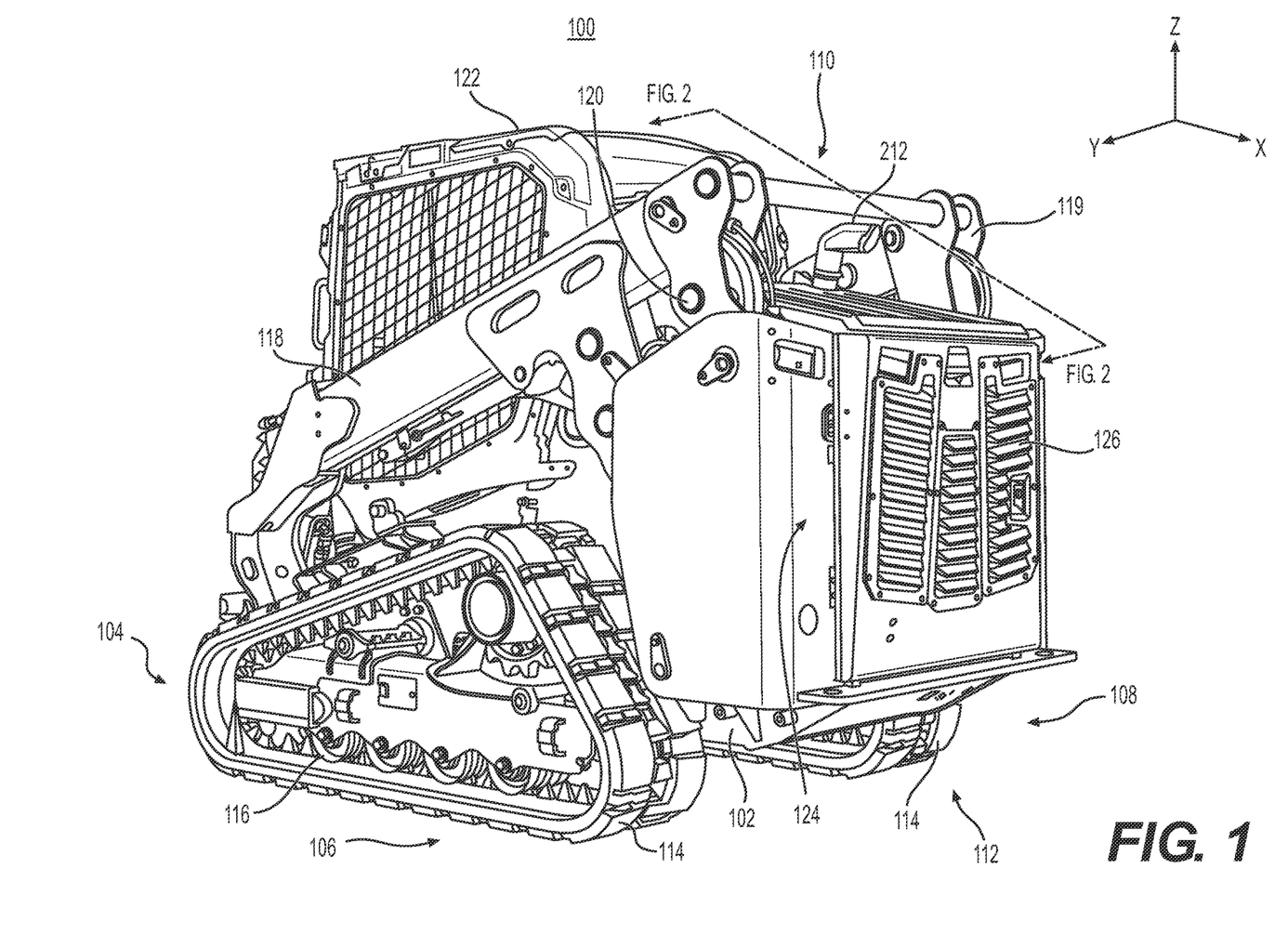
FIG. 1 is an isometric view of a compact loader in accordance with an example of the present disclosure.

Wherever possible, the same reference numbers will be used throughout the drawings to refer to the same or like parts. FIG. 1 illustrates an isometric view of a work machine 100 within an XYZ coordinate system as one example suitable for carrying out the principles discussed in the present disclosure. Work machine 100 is illustrated in FIG. 1 as a compact track loader, although work machine 100 may be any type of compact loader known in the field by a variety of names, such as a skid steer loader, tracked skid steer loader, multi-terrain loader, etc. Often the terminology applied to work machine 100 turns on the form of traction of the machine, with skid steer loaders having wheels with tires and tracked skid steer loader machines or multi-terrain loader machines utilizing an endless track undercarriage to provide greater traction in mud, snow, ice and the like. As discussed further below, the form of traction for work machine 100 is not material to the examples described, and "compact loader" is used generically to refer to the overall class of loaders.

Similarly, the term "machine" as used in this disclosure refers to any machine that performs some type of work operation associated with an industry, such as mining, construction, farming, landscaping, or transportation. Compact loaders, such as a compact track loader as illustrated for work machine 100, may perform many work functions across a range of industries. The principles of this disclosure could be applied to other machines having more focused capabilities, such as a wheel loader, excavator, dump truck, backhoe, motor grader, material handler or the like.

As generally embodied in FIG. 1, work machine 100 includes a body or frame 102, that houses and supports a variety of components and assemblies. Work machine 100 travels in a forward direction from right to left along the X-axis in FIG. 1, such that for purposes of reference, the sides of work machine 100 are generally denoted as front side 104, left side 106, right side 108, top side 110, and rear side 112. For purposes of illustration and reference, and in general, front side 104 and rear side 112 are depicted in the Y-Z plane, left side 106 and right side 108 are shown in the X-Z plane, and top side 110 is positioned in the X-Y plane.

Work machine 100 includes continuous tracks 114 on its left side 106 and right side 108 that rotationally propel the machine. A set of wheels 116 is enclosed by, and at least some of those wheels are engaged with, tracks 114 and causes tracks 114 to rotate and move work machine 100. Work machine 100 can cause tracks 114 to operate at multiple speeds and in a forward and a reverse direction. Tracks 114 are independently controlled and activated, thereby enabling turning of work machine 100 outside of a linear path, often within a small radius, and providing overall skid-steering maneuverability.

In addition, a pair of lift arms 118 are pivotably attached to frame 102 through a linkage 119 and extend longitudinally in the X-axis on both left side 106 and right side 108 of work machine 100. Lift arms 118 rotate in conjunction with linkage 119 around pivot points 120 near the top side 110 to provide a raising and lowering action for the front of lift arms 118. Although not shown in the figures, lift arms 118 support a work tool at their ends at front side 104 of work machine 100 for executing a work function. The work tool may be any item for assisting in executing a function, typically a loader or bucket. Any other tool could alternatively be attached depending on the need, such as a pallet fork, broom, grinder, tiller, rake, blade, or auger. Lift arms 118 include many ancillary components to assist with their operation that are not discussed in this disclosure solely for purposes of simplicity, such as lift linkages, power trains, hydraulic pumps, motors, valves, hydraulic lines, and a hydraulic tank.

As shown in FIG. 1, work machine 100 includes an operator's cab 122 positioned somewhat forward toward front side 104 on frame 102. Cab 122 is situated between lift arms 118 and includes a seat and various controls and electronics for operating work machine 100. The controls and electronics may include a plurality of devices, such as joysticks, pedals, levers, user interfaces, and other types of display and input devices to control various operations associated with work machine 100, such as controlling lift arms 118 and independently activating tracks 114. Cab 122 typically is surrounded by a cage to provide protection for an operator seated within while enabling adequate visibility to the surroundings. As discussed in more detail below, cab 122 may have a rear window or opening to provide visibility behind the operator from within cab 122.

Work machine 100 also includes an engine compartment 124 that is rear mounted on frame 102. By "rear mounted," it is meant that engine compartment 124 is positioned closer to rear side 112 of work machine 100 than to front side 104. More specifically, engine compartment 124 is mounted behind operator cab 122, along the X-axis as in FIG. 1, relative to front side 104 of work machine 100. An engine not shown in FIG. 1 is housed within engine compartment 124 and has substantial weight relative to the rest of work machine 100. By being rear mounted toward rear side 112 in work machine 100, engine compartment 124 helps provide ballast and may counterbalance a heavy load imparted by or on a work tool attached to lift arms 118 at front side 104 of work machine 100.

A grille 126 is positioned along a back wall of at least a portion of engine compartment 124 at a rear side 112 of work machine 100. Grille 126, representatively shown in FIG. 1 with slats or louvers, may include a framework or structure for covering rear side 112 of engine compartment 124 while still allowing the passage of air therethrough. As discussed in more detail below for some examples, air is drawn through grille 126 to help cool engine compartment 124, although an ejection of air through grille 126 is also possible for other examples.

Figure 2:
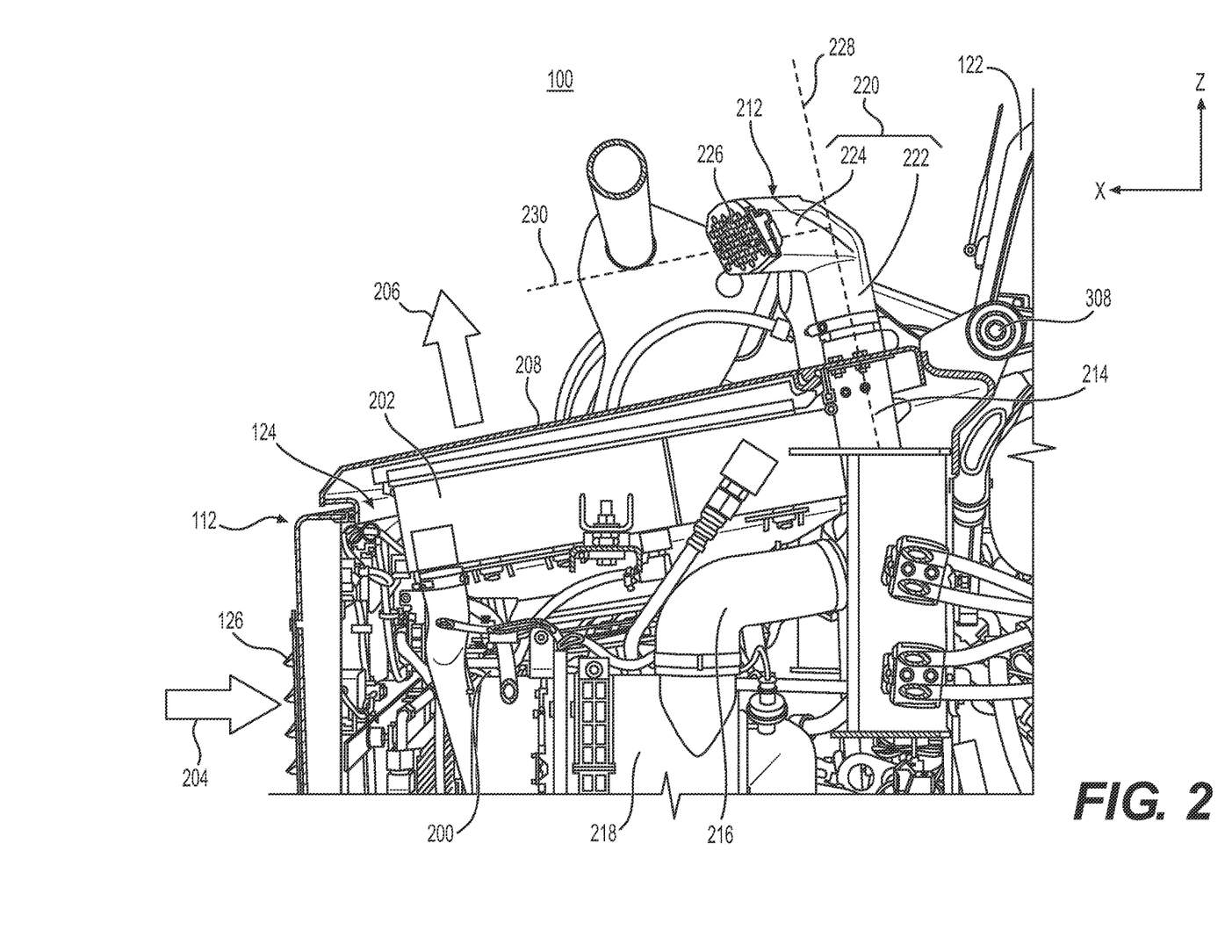
FIG. 2 is a fractional side view of a cutaway as indicated on FIG. 1 of an engine compartment within the compact loader of FIG. 1 in accordance with an example of the present disclosure.

While FIG. 1 depicts an exterior of work machine 100 from a perspective of the left rear corner of the machine, FIGS. 2-5 illustrate more detailed views of work machine 100 relative to the present disclosure. For instance, FIG. 2 is an internal view of engine compartment 124 along cutaway lines shown on work machine 100 in FIG. 1. In particular, in the cutaway of FIG. 2, an outer wall and one of lift arms 118 are virtually removed to expose internal components of work machine 100 when viewed from right side 108 across the X-Z plane. The following discussion refers interchangeably between the different perspectives of work machine 100 shown in FIGS. 2-5.

Referring to FIG. 2, an engine 200 is housed within engine compartment 124 behind cab 122. Otherwise termed a power source, engine 200 produces and delivers mechanical power for operating various functions of work machine 100, such as the power necessary to propel work machine 100 and to operate various actuators and systems of work machine 100. In examples, engine 200 is an internal combustion engine such as, for example, a diesel engine, a gasoline engine, an electric-gas hybrid engine, or any other configuration of engine apparent to one skilled in the art. Other features of engine 200 may include a fuel system, an exhaust system, and a cooling system, which are either discussed in relevant context below or excluded solely for purposes of simplicity.

In accordance with examples of the present disclosure, work machine 100 includes a cooling system for engine 200 including a cooling package 202. As will be appreciated, engines for compact loaders such as work machine 100 may generate significant heat due, at least in part, to the heavy lifting and work performed combined with the small size of the machine and correspondingly small engine compartment 124 available for ventilating the heat. Engine 200 can be liquid-cooled in a manner known in the art, such as with one or more heat exchangers (not shown) circulating liquid coolant through engine 200 to extract heat. Cooling package 202 functions to remove heat created by engine 200 and absorbed, in some implementations, by the liquid coolant within one or more heat exchangers and to pass the heat into the environment and away from work machine 100. As shown in FIG. 2, cooling package 202 is positioned vertically above engine 200, i.e., displaced predominantly in the Z-axis, and in an upper portion of engine compartment 124. In general, cooling package 202 operates essentially as a radiator and includes the one or more heat exchangers and a blower fan (not shown) for extracting and expelling heat from the engine coolant to the air passing through engine compartment 124.

Specifically, as work machine 100 is operated, a blower fan within cooling package 202 may draw ambient air through grille 126 at rear side 112 of work machine 100 and into engine compartment 124. This cooling airflow is depicted as arrow 204 in FIG. 2 entering engine compartment along the X-axis at rear side 112. In one example, the structure of engine compartment 124 helps direct cooling airflow 204 primarily in through grille 126. Sidewalls of engine compartment 124 block ambient air from being drawn into engine compartment 124 from the left side 106 and right side 108 of work machine 100 (shown in FIG. 1). A bottom portion of engine compartment 124 on the underside of frame 102 may also significantly block ambient air from entering engine compartment 124 from beneath work machine 100. Therefore, the structure of the rear portion of work machine 100 combined with a blower fan within cooling package 202 contribute to cooling airflow 204 being drawn into grille 126 at a rear side 112 of work machine 100.

After entering engine compartment 124 through grille 126, cooling airflow 204 absorbs heat from engine 200 and engine compartment 124 within cooling package 202. Heat exchangers (not shown) within cooling package 202 may contain coolant to help transfer thermal energy from engine 200 to cooling airflow 204, converting cooling airflow 204 into heated air. Cooling package 202, being positioned vertically above engine 200 as shown in FIG. 2, is configured in a predominantly horizontal orientation so that its blower fan forces air upwardly from engine 200 and work machine 100. As a result, in one example depicted in FIG. 2, cooling package 202 forces the heated air as a heated airflow, shown as arrow 206, upwardly from engine compartment 124 into the environment, exhausting thermal energy from engine 200.

Figure 3:
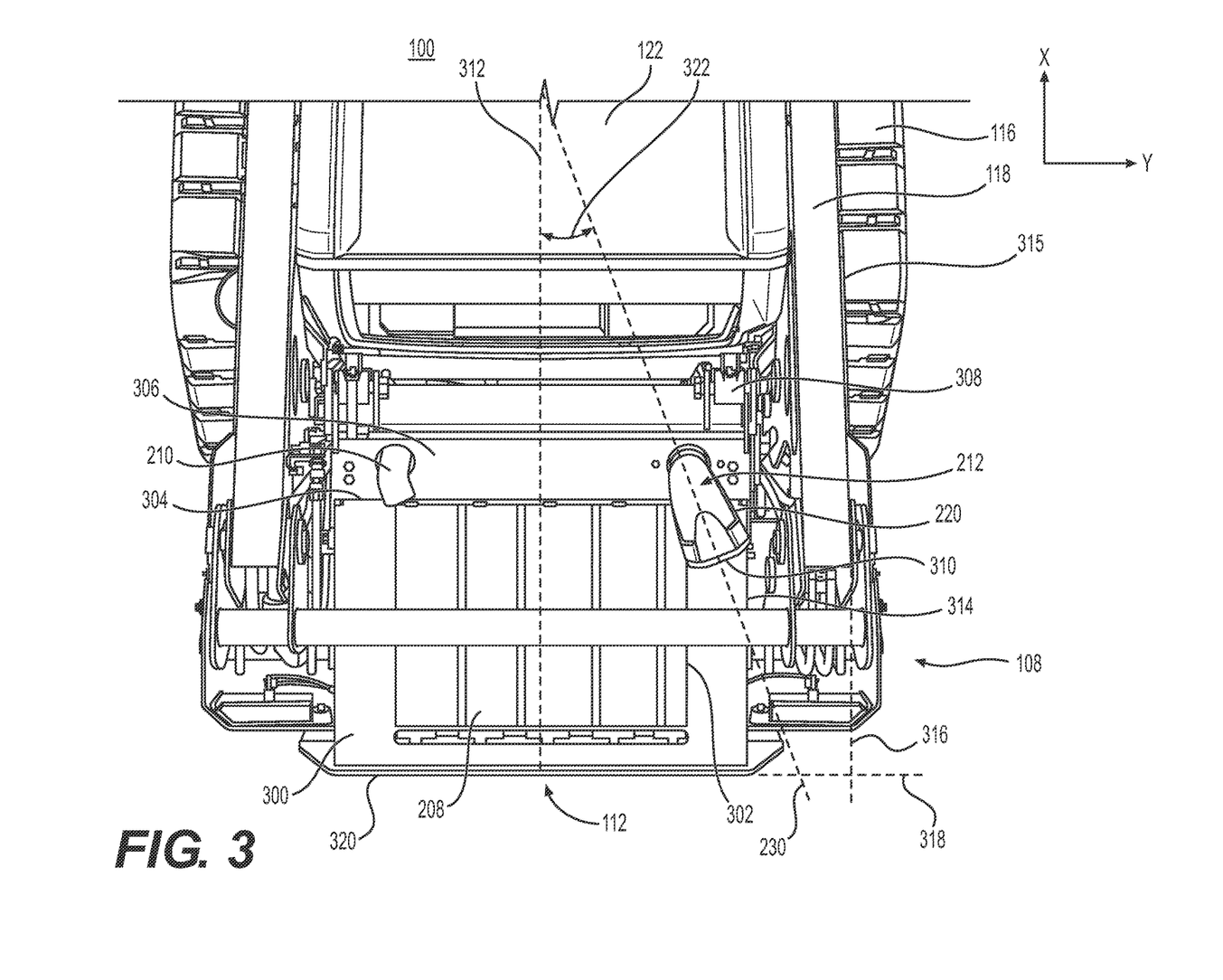
FIG. 3 is a fractional top view of the compact loader in FIG. 1 in accordance with an example of the present disclosure.
Figure 4:
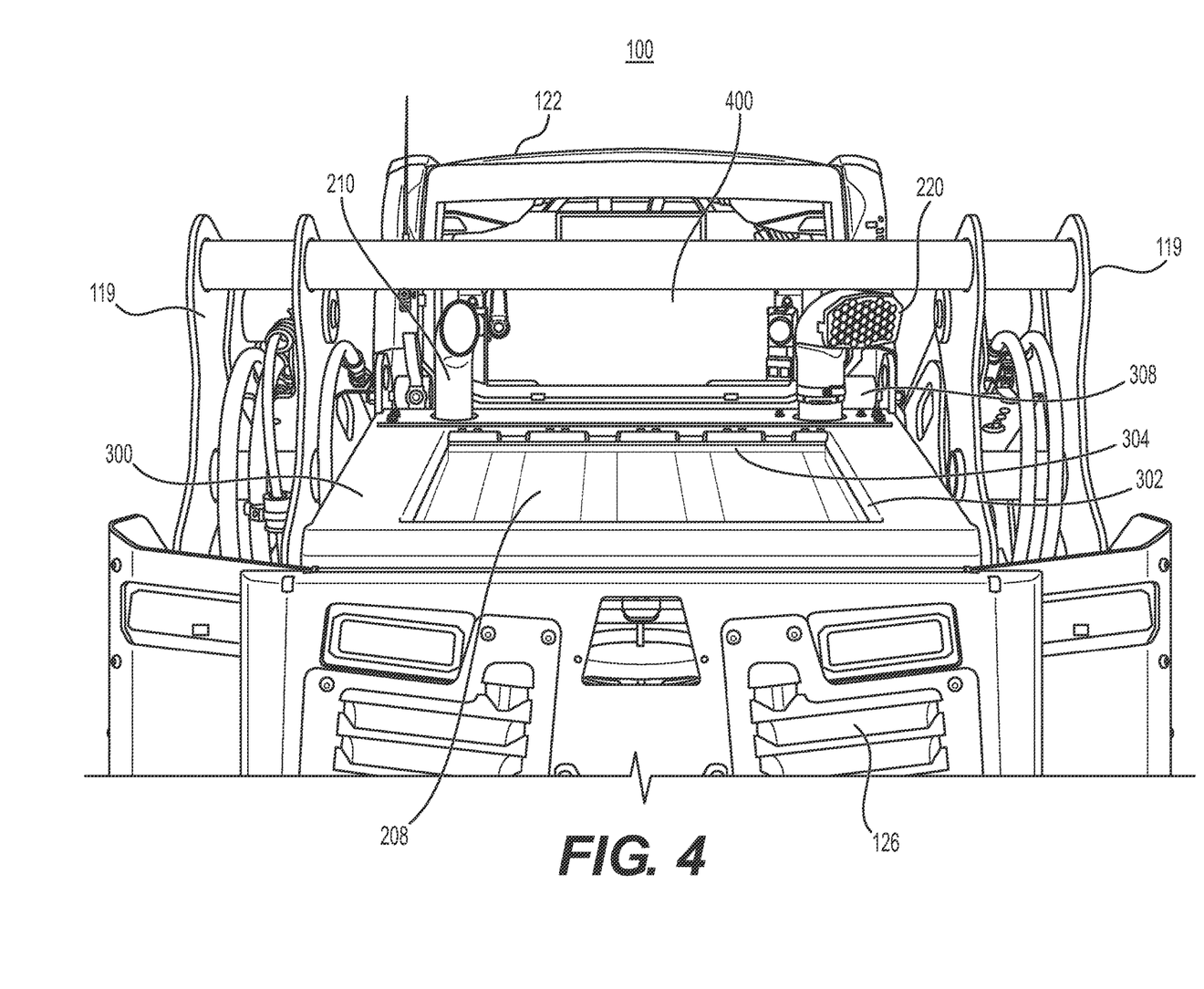
FIG. 4 is a fractional rear view of the compact loader in FIG. 1 in accordance with an example of the present disclosure.
Figure 5:
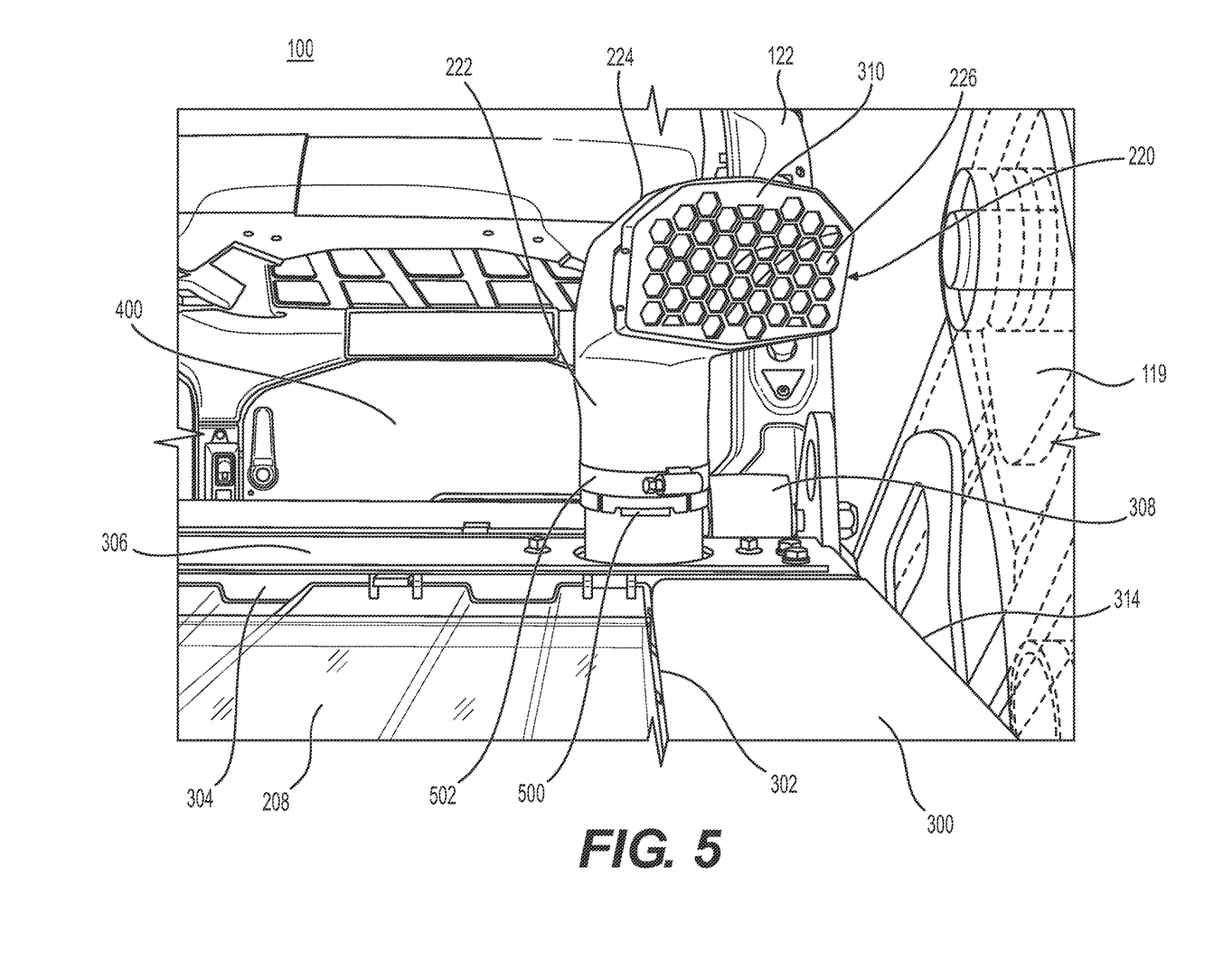
FIG. 5 is a zoomed view of a directional intake cap in FIG. 4 in accordance with an example of the present disclosure.

Heated airflow 206 exits engine compartment 124 into the atmosphere above work machine 100 via a cooling vent 208. FIGS. 3-5 provide different perspectives from rear side 112 of work machine 100 and illustrate an exemplary structure for cooling vent 208. In one option, cooling vent 208 is a grating, grille, or similar structure such as perforated sheet metal. Cooling vent 208 is positioned over cooling package 202 to allow egress of heated airflow 206 while protecting cooling package 202 from objects that may drop or fall on top side 110 of engine compartment 124.

FIG. 3 is a top view of work machine 100 from a perspective at rear side 112, showing the rear section of work machine 100 substantially in the X-Y plane. As indicated in FIG. 3, cooling vent 208 may be formed as part of and within a rear closure 300 that is mounted to frame 102. In some examples, rear closure 300 spans a majority portion of the surface area of the upper side of engine compartment 124, and cooling vent 208 covers a smaller area centered within rear closure 300. A boundary 302 defines a perimeter or outer edge of cooling vent 208 outside of which on rear closure 300 heated airflow 206 does not exit from engine compartment 124. For the examples of FIGS. 3-5, rear closure 300 and cooling vent 208 are both polygonal in shape, although the geometric configuration chosen for each depends on the implementation.

In some examples, rear closure 300 is configured to be removable from work machine 100 to provide access to cooling package 202 and other components within engine compartment 124. In other examples, rear closure 300 may be attached to engine compartment 124 via a hinged end 304 across its forwardmost end in the Y-direction. In this implementation, rear closure 300 may be pivoted open across hinged end 304 to enable access within engine compartment 124 while rear closure 300 remains attached to work machine 100. Support mechanisms such as a gas spring or hydraulic lift may assist with opening and closing rear closure 300.

Referring to FIGS. 3 and 4, engine 200 in some examples has an exhaust stack 210 extending from engine compartment 124 into the environment. Exhaust stack 210 may be in the form of a pipe, tube, cylinder, or other shape serving as a conduit of hot gas. One end of exhaust stack 210 extends within engine compartment 124 and may be coupled to a diesel particulate filter (not shown) of engine 200. As known to those skilled in the art, a diesel engine, such as engine 200 in certain implementations, may force particulate matter within exhaust gases generated from engine combustion to be deposited on porous walls within a diesel particulate filter. In some examples, accumulated particulate matter is removed from the particulate filter through a passive or active regeneration process. During passive regeneration, high temperature exhaust gas passing through the diesel particulate filter burns off soot particles trapped therein. During active regeneration, on the other hand, combustible material (e.g., diesel fuel) is injected into the exhaust gas upstream of the diesel particulate filter to assist in increasing the temperature of the exhaust, thereby burning off the trapped soot. Exhaust stack 210 routes the exhaust gas from engine 200 and extends through work machine 100 at a top side 110 of engine compartment 124 adjacent to cooling vent 208. At a second end of exhaust stack 210, the exhaust gas exits into the environment at a position to minimize potential harm or discomfort to an operator within cab 122 or to personnel standing near to work machine 100.

In some examples, such as shown in FIGS. 3-5, exhaust stack 210 is positioned between hinged end 304 of rear closure 300 and cab 122, i.e., along the X-axis in FIG. 3. When viewed from top side 110, the surface area of the upper side of engine compartment 124 includes a top plate 306 arranged between rear closure 300 and cab 122 through which exhaust stack 210 is mounted. As shown, the upper surface of engine compartment 124 in the examples illustrated predominantly includes rear closure 300 and top plate 306. A firewall (not shown) may serve as a front wall of engine compartment 124 and help isolate an operator and electronic equipment in cab 122 from high temperatures and gases emanating from engine compartment 124. Similarly, exhaust stack 210 is longitudinally positioned behind and directed away from cab 122, i.e., toward rear side 112. In particular, exhaust stack 210 is oriented in the Z-axis and can be shaped so that exhaust exiting the outlet flows over cooling vent 208 and into the heated airflow 206 ejected upwardly from cooling vent 208.

Consistent with examples of the present disclosure, engine 200 of work machine 100 further includes an air intake assembly 212. Air intake assembly 212, shown for instance in FIG. 2, is configured to provide a passageway for feeding ambient air from a distal end of air intake assembly 212 into engine 200 at a proximal end for combustion. Along with miscellaneous connection components, air intake assembly 212 may include an air intake pipe 214, a hose 216, and an air cleaner 218. Additionally, as detailed below, a directional cap 220 is coupled to a distal end of air intake pipe 214 to directionally select a flow of ambient air to be fed into engine 200. While depicted in this disclosure and discussed in the following as separate components, one or more of air intake pipe 214, hose 216, and directional cap 220 may be structurally combined as desired.

Referring to the fragmentary side view of FIG. 2, air intake pipe 214 is located adjacent to cooling vent 208, being more forward within work machine 100 along the X-axis, where a distal end of air intake pipe 214 exits engine compartment 124 at top side 110. While described as a pipe, air intake pipe 214 may be a tube, hose, or other configuration of varying shapes sufficient to confine and convey gas in the form of ambient air from the atmosphere surrounding work machine 100. As also shown in FIGS. 3-5, air intake assembly 212 may exit engine compartment 124 from top side 110 longitudinally along the X-axis between cooling vent 208 and cab 122, such as by passing through an orifice in top plate 306. In one example, exhaust stack 210 and air intake assembly 212 are laterally aligned along the Y-axis on work machine 100 within engine compartment 124 directly rearward from operator's cab 122.

As shown in FIG. 2, cooling package 202 and cooling vent 208 at a top side 110 of engine compartment 124 may be slightly inclined rearwardly. That is, those components are angled slightly off the Z-axis as they extend from cab 122 to rear side 112. Air intake pipe 214 has a pipe axis 228 that is shown as sloping slightly rearwardly, such that a distal end of air intake pipe 214 is offset from vertical along the Z-axis with respect to ground or frame 102 of work machine 100 and slightly toward the X-axis. As a result, pipe axis 228 of air intake pipe 214 in FIG. 2 is substantially perpendicular to rear closure 300 and substantially parallel to heated airflow 206. In alternative examples not shown, pipe axis 228 may be substantially vertical in orientation with respect to work machine 100 regardless of the precise horizontal arrangement of cooling vent 208 and rear closure 300. The exact tilt or orientation of air intake pipe 214 in the X-Z plane depends on the implementation for work machine 100 and is within the discretion of a person of ordinary skill in the field.

Referring to FIGS. 3 and 4, in some examples of the present disclosure, air intake assembly 212, and particularly air intake pipe 214, is positioned at a lateral or transverse location along the Y-axis on work machine 100 proximate to an outer vertical edge of a port 400. Port 400 may be a rear window or opening within a rear side of a protective cage covering cab 122, which, as discussed above, provides visibility for an operator within cab 122 to see behind work machine 100. By situating air intake assembly 212 proximate a vertical edge of port 400, which in the example of FIGS. 3 and 4 is at a far right side of port 400, air intake assembly 212 is not in a position to obstruct the view of an operator from cab 122. Whether by looking in a mirror or by turning around, the operator's visibility rearward remains unimpeded. As will be evident from the figures, the sightlines for an operator into air intake assembly 212 would also align with a rear end of lift arms 118 and linkage 119, further confirming that the positioning of air intake assembly 212 does not introduce an obstruction to the view behind work machine 100 from cab 122. Locating air intake assembly 212 to a far right side of port 400 has an additional benefit of distancing directional cap 220 from the hot gases exiting exhaust stack 210, for reasons discussed further below.

Vertically, air intake assembly 212 extends above the outer surface of rear closure 300 and, at least in the examples illustrated, to a height substantially equal to the height of exhaust stack 210. One skilled in the art will appreciate that both pipes provide advantages functionally from being as high as possible, exhaust stack 210 for emitting exhaust gas and air intake assembly 212 for taking in combustion air. Practical concerns, however, may restrict the available height for exhaust stack 210 and air intake assembly 212. For the examples illustrated, cab 122 is attached to frame 102 with one or more hinges 308 that enable the protective cage to be pivoted backward. The pivoting enables the area within cab 122 to be more easily accessed, such as for providing service to components within cab 122 and the surrounding region of work machine 100. As the protective cage is pivoted backward, it may collide with structures extending vertically above engine compartment 124. Therefore, exhaust stack 210 and air intake assembly 212 are provided with a height sufficient to enhance their respective functionality without unnecessarily impeding the pivoting of a protective cage as part of opening cab 122. In the examples illustrated, air intake assembly 212 is positioned with a distance in the range of about 129 mm to about 143 mm between the lowest surface on directional cap 220 to the upper surface of top plate 306, with a nominal distance of about 136 mm. It will be apparent that these dimensions are not limiting to the disclosed concepts and that other heights may be chosen depending on the implementation. Additionally, as discussed below and illustrated, directional cap 220 in some examples resembles a periscope with a head 224 extending from a neck 222. This extension of head 224 away from cab 122 may further provide clearance for cab 122 so that air intake assembly 212 does not impede its pivoting.

Returning to FIG. 2, according to examples of work machine 100, air intake pipe 214 is coupled to hose 216. As with air intake pipe 214, hose 216 is any form of tube, hose, or pipe sufficient to confine and convey gas in the form of ambient air. Hose 216 in FIG. 2 is flexible and permits a bending of the air path to conform to the limited space within engine compartment 124 so that air intake pipe 214 may be coupled with air cleaner 218.

Air cleaner 218 receives ambient air from air intake pipe 214 and hose 216 and includes one or more air filters. The air filters (not shown) remove particulates from the received air before the air is passed to engine 200 for combustion. When the air filters require servicing, air cleaner 218 is accessed from within engine compartment 124. Servicing the filters within air cleaner 218 may be done, for example, due to the passage of time or due to the accumulation of a quantity of particulates from the ambient air.

As an additional component of air intake assembly 212, directional cap 220 may be coupled to a distal end of air intake pipe 214 above an outer surface of top side 110 and cooling vent 208. Directional cap 220 provides a beginning of the passageway within air intake assembly 212 for ambient air to be fed to engine 200. In some examples, directional cap 220 is a casing shaped to resemble an angled periscope head or an angled vacuum attachment and generally has two portions: a neck 222 and a head 224. Neck 222 may be a tubular region formed to mate with the shape of air intake pipe 214 and be aligned along pipe axis 228. Alternatively, an additional component could be used to couple neck 222 to air intake pipe 214 and to join divergent shapes, which would be within the knowledge of the skilled artisan. As a tubular region, neck 222 largely continues vertically the passageway formed by air intake pipe 214.

Beyond neck 222, the structure of directional cap 220 expands to encase a larger, elongated cavity in the shape of head 224. While head 224 is depicted in the figures as an oblong shape, head 224 may take any shape or volume desired for the implementation. Head 224 bends the passageway in a direction substantially orthogonal to pipe axis 228 of neck 222 and along a central axis 230. In this way, head 224 extends away from neck 222 at approximately a right angle. Head 224 culminates in a front edge defining an orifice or opening 226 where ambient air may enter air intake assembly 212. While the front edge of head 224 defining opening 226 is depicted in the figures as being essentially planar, the edge and opening 226 may be of any shape desired to achieve the behavior described in this disclosure.

In some examples, directional cap 220 is structured to block ingress to air intake pipe 214 from sides or angles around head 224 and neck 222 other than in front of or through opening 226. For example, as shown in FIGS. 2-5, directional cap 220 has a body without openings on a side of neck 222 or head 224 above, below, left, right, or opposite from opening 226. As a result, opening 226 serves as the entry point for ambient air, and head 224 has an element of directionality for taking in air based on where opening 226 is oriented. Moreover, the directionality of directional cap 220 may prevent entry of items other than air into air intake assembly 212 from angles other than in front of opening 226. These items might include debris in the work environment from right or left sides of head 224 or rain and other precipitation from above. A top wall of head 224 may enhance protection from rain by extending longer (in the X-direction in FIG. 2) than a bottom wall of head 224, leading to an overhang at opening 226.

To further prevent the ingress of unwanted items, directional cap 220 in some examples includes mask 310 covering opening 226 of head 224. Mask 310 may be a filter, screen, mesh, or other perforated surface enabling the passage of air but blocking solids beyond a certain size. Mask 310 could be removable from head 224, permitting cleaning or removal of debris trapped within mask 310 or to be replaced if damaged, or could be integrally formed as part of head 224.

In accordance with embodiments of this disclosure, directional cap 220 and mask 310 are made from molded plastic or similar material to provide low weight, inexpensive producibility, and flexibility. Directional cap 220 and mask 310 may extend above the main structure of work machine 100, subjecting them to being struck by debris within a work site. Operating in rugged environments, work machine 100 may be struck by branches, rocks, dirt clods, or other elements that could damage directional cap 220 and mask 310 as lift arms 118 perform their work. Accordingly, flexibility of plastic or similar construction may help guard directional cap 220 and mask 310 against permanent deformation. To the extent directional cap 220 and mask 310 become damaged or degrade through wear, the parts may be easily and cheaply replaced.

Being coupled through a fitting between neck 222 and air intake pipe 214, directional cap 220 may be turned or swiveled rotationally on air intake pipe 214. Rotation of directional cap 220 changes the orientation of the direction in which central axis 230 points and in which head 224 and opening 226 face. As discussed above, a casing or body of directional cap 220 prevents air from entering directional cap 220 at directions around neck 222 and head 224 other than through opening 226. Therefore, rotating directional cap 220 on air intake pipe 214 may enable the intake of ambient air selectively from any location around neck 222 that is in front of opening 226. Depending on the implementation, directional cap 220 may then be oriented to position opening 226 to access air flows best suited for engine 200.

In some examples as shown in the figures, directional cap 220 is angularly oriented on air intake pipe 214 into a position such that opening 226 is on top side 110 of the engine compartment 124 and central axis 230 points rearwardly (predominantly in the X-direction) on work machine 100. As such, opening 226 is located away from sources of dirt and dust at right side 108 of work machine 100 in the figures. The movement of tracks 114 on the ground may loosen dirt and cause loose particles to be suspended in the air around right side 108, for example. In addition, the movement of lift arms 118 in performing work may generate dirt and dust in the air along front side 104 and right side 108 of work machine 100, for example. Moreover, by directing central axis 230 and opening 226 rearwardly, the body of directional cap 220 may help block an intake of airborne debris or other elements, such as rain, as work machine 100 travels forward (i.e., along the X-axis). As a result, the location of air intake assembly 212 inwardly on work machine 100 from lift arms 118 and the orientation of opening 226 away from right side 108 can decrease the particulates collected by air cleaner 218 compared with when intake occurs on a side of frame 102 near tracks 114 or lift arms 118.

Additionally or alternatively, directional cap 220 is rotationally oriented on air intake pipe 214 (around the Z-axis) into a position such that opening 226 at the end of elongated head 224 is horizontally over the top outer surface of engine compartment 124 and aside cooling vent 208. As shown in FIG. 3, a longitudinal centerline 312 along the X-axis may be used for reference. Opening 226, protected by mask 310, is positioned horizontally along the Y-axis apart from longitudinal centerline 312 to be outside of cooling vent 208, and specifically at a horizontal position rightward on the Y-axis beyond a portion of boundary 302. Further, to help avoid the intake of particulates arising at right side 108, opening 226 may be positioned between the portion of boundary 302 and a side outer surface 314 of engine compartment 124.

In some examples, opening 226 is also positioned to avoid the intake of heated air for engine combustion. As discussed above, heated airflow 206 emits thermal energy from engine 200 in a forced wind stream. Therefore, heated airflow 206 is typically much higher in temperature than ambient air and accessing all or a substantial amount of heated airflow 206 for air intake may exceed the temperature limits set for air provided to engine 200. In addition, exhaust stack 210 may emit gases at even higher temperatures. During a regeneration cycle for a diesel particulate filter, for instance, exhaust temperatures may reach 600 degrees C. As shown in FIG. 3, exhaust stack 210 is angled over cooling vent 208, slightly toward a center of work machine 100, so that exhaust from exhaust stack 210 fluidly mixes with heated airflow 206. Therefore, to access air closer to ambient temperature, opening 226 is positioned over engine compartment 124 at a horizontal (or lateral or transverse) position with respect to longitudinal centerline 312 that is aside cooling vent 208. In this way, opening 226 is positioned somewhat away from, and not over, heated airflow 206. The distance of separation between opening 226 and heated airflow 206 will depend on the implementation and will be subject to experimentation. The distance of separation could be zero, with some slight overlap occurring between opening 226 and cooling vent 208 whereby only a small quantity of heated air leaving cooling vent 208 enters opening 226. In some examples, the size of opening 226 could be adjustable to vary the amount or characteristics of the air taken in by directional cap 220 without interfering with the needs of engine 200 to have a sufficient quantity of clean air for combustion.

On the other hand, heated airflow 206 exits cooling vent 208 with a velocity that may help remove debris from over cooling vent 208 or prevent debris from moving into the area over cooling vent 208. The draft of heated airflow 206 may create a negative pressure in the vicinity of rear closure 300 that draws particulates into heated airflow 206, which in the examples of FIGS. 2-5 is in an upwardly direction in the Z-axis away from top side 110 of work machine 100. Therefore, while positioning directional cap 220 horizontally apart from cooling vent 208 will help avoid the intake of ambient air having highly increased temperatures from heated airflow 206, it is advantageous to position head 224 so that opening 226 is in the vicinity of heated airflow 206. Being positioned adjacent to boundary 302 as shown in FIGS. 3-5, for example, opening 226 may benefit from negative pressure that sweeps particulates into heated airflow 206 and avoids their entering opening 226 as part of the ambient air fed to engine 200. Moreover, and as illustrated, the front edge of head 224, which defines opening 226, may be configured to be substantially planar and parallel to heated airflow 206 to take advantage of the negative pressure from heated airflow 206 without taking in particulates from heated airflow 206.

As noted above, the structure of directional cap 220 also contributes to the selectivity of ambient air being taking into engine 200. Having an elongated form, head 224 on directional cap 220 has sides around its oblong body that effectively block the ingress into directional cap 220 from those sides, whether by particulates in the ambient air along the right side 108 of work machine 100 or overly hot air within heated airflow 206. For instance, as shown in FIG. 3, at least one side of directional cap 220 (e.g., the side closer to longitudinal centerline 320) is between heated airflow 206 and the elongated cavity within the directional cap. As a result, that side of the directional cap structurally blocks heated airflow from entering into air intake assembly 212. Likewise, the opposite side of directional cap 220 in FIG. 3 farther from longitudinal centerline 320 blocks ambient air near the one of the lift arms 118 on right side 108, which may carry a high quantity of particulates, from entering into air intake assembly 212.

Air intake assembly 212 in some examples provides further selectivity of ambient air for engine 200 in that directional cap 220 may be positioned to orient opening 226 at an angle. For example, because heated airflow 206 exits engine compartment 124 through cooling vent 208 within rear closure 300, facing directional cap 220 and opening 226 somewhat away from heated airflow 206 may help the structural sides of directional cap 220 shield opening 226 and help minimize the intake of air having elevated temperatures into air intake assembly 212. As shown in FIGS. 3 and 5, for example, directional cap 220 is rotationally positioned on air intake pipe 214 so that central axis 230, passing through opening 226, generally points to or aligns with a rear corner of work machine 100. In this orientation, together with the positioning of opening 226 between cooling vent 208 and side outer surface 314 transversely on engine compartment 124 (along the Y-axis), directional cap 220 may improve the quality of ambient air it receives. At that location, negative pressure from heated airflow 206 causes a decreased quantity of particulates compared with other locations around engine compartment 124, and the position and angle of opening 226 may largely avoid the increased temperatures exiting cooling package 202. Moreover, at this position, opening 226 of directional cap 220 faces away from, or at least parallel with, an outlet of exhaust stack 210 to minimize the influence of elevated exhaust temperatures on ambient air being taken in.

On the other hand, because ambient air having a high quantity of particulates is often found around tracks 116 or lift arms 118, facing direction cap 220 and opening 226 somewhat away from the side of work machine 100 may help minimize the intake of air having elevated particulate levels into air intake assembly 212. By orienting opening 226 of directional cap 220 away from right side 108 and lift arms 118 and toward rear side 112, air intake assembly 212 may avoid these sources of suspended particulates and help decrease the quantity of particulates entering air intake pipe 214 and needing to be removed by air cleaner 218. As a result, as shown in the figures, directional cap 220 is oriented on air intake pipe 214 so that opening 226 does not directly face right side 108 of work machine 100. Instead, opening 226 faces predominantly toward rear side 112 rather than toward right side 108 (i.e., toward the X-axis rather than toward the Y-axis in the figures).

To balance these competing factors, directional cap 220 in some examples is oriented such that opening 226 faces both away from cooling vent 208 and away from right side 108 near lift arms 118. FIGS. 3-5 depict directional cap 220 being oriented to face rearwardly on work machine 100, away from right side 108, and away from heated airflow 206 exiting cooling vent 208. One method of assessing the orientation of directional cap 220 to balance competing factors is shown in FIG. 3. The one of lift arms 118 on the right side 108 of work machine 100 has an outermost surface 315. Outermost surface 315 is in the X-Z plane and is substantially in parallel with longitudinal centerline 312. Side vertical plane 316 coinciding with outermost surface 315 serves as a representative plane of reference for the outside of work machine 100 near tracks 116 where high quantities of particulate or debris are generated. Other planes of reference could also be used. Rear vertical plane 318 is another plane of reference that is in the Y-Z plane and is substantially orthogonal to longitudinal centerline 312. Rear vertical plane 318 coincides with a rearmost surface 320. As shown in FIG. 3, directional cap 220 is oriented at an angle 322 between central axis 230 and longitudinal centerline 312 where central axis 230 is pointed toward the right rear corner of work machine 100. More specifically, central axis 230, which extends through the elongated cavity of head 224 and through opening 226, intersects rear vertical plane 318 before intersecting side vertical plane 316. In this position, directional cap 220 can be angled slightly away from heated airflow 206 and slightly away from air near tracks 116 and lift arms 118 to take in ambient air that has not been heated excessively and has a lower quantity of particulates.

Within the parameters provided above, variations for the location of opening 226 and angle 322 of directional cap 220 will be apparent to those skilled in the art and could vary based on the implementation. For example, while the figures and this disclosure address the placement of air intake assembly 212 on the right side of work machine 100, air intake assembly 212 could alternatively be installed on the left side of engine compartment 124 with exhaust pipe 210 being installed on the right side. Also, other values for angle 322 will depend on various factors, such as the location of air intake pipe 214 within engine compartment 124 and a configuration for rear closure 300.

Angle 322 for directional cap 220 on air intake pipe 214 may be determined in advance for work machine 100. In some examples for the implementation illustrated in FIG. 3, central axis 230 may be rotated so that angle 322 varies across a predetermined range from between 18 degrees and 28 degrees from longitudinal centerline 312, with a nominal angle of about 23 degrees. Or directional cap 220 may be rotated and aligned by eyesight with components of work machine 100 as discussed, such as considering an orientation relative to boundary 302 of cooling vent 208 and the side outer surface 314 of engine compartment 124 or the outermost surface 315 of one of lift arms 118.

Once the angle 322 is determined, directional cap 220 in some examples is fixed in position on air intake pipe 214 using collar 502, which can be a hose clamp or a similar anchoring device. A worm drive or similar device may be used to tighten collar 502 to secure directional cap 220 in place. Alternatively or additionally, some examples include air intake assembly 212 having a keyed coupling 500 to ensure directional cap 220 is oriented at the desired angle 322 on air intake pipe 214. As shown in FIG. 5, keyed coupling 500 includes a slot, notch, or recess in a lower edge of neck 222 that mates with a key, flange, or other elevated structure of corresponding size and shape on the upper edge of air intake pipe 214. The slot and the key may be reversed between the components as desired. Installing directional cap 220 on air intake pipe 214, either as an original part during manufacture of work machine 100 or as a replacement part, entails sliding neck 222 vertically onto air intake pipe 214 and rotating directional cap 220 into a position where the slot on neck 222 aligns with the key on air intake pipe 214, thereby engaging keyed coupling 500. Once engaged, the keyed coupling 500 will forcibly position and hold directional cap 220 in place rotationally so that central axis 230 is at angle 322 from longitudinal centerline 312. Collar 502 may then secure directional cap 220 in place.

Figure 6:
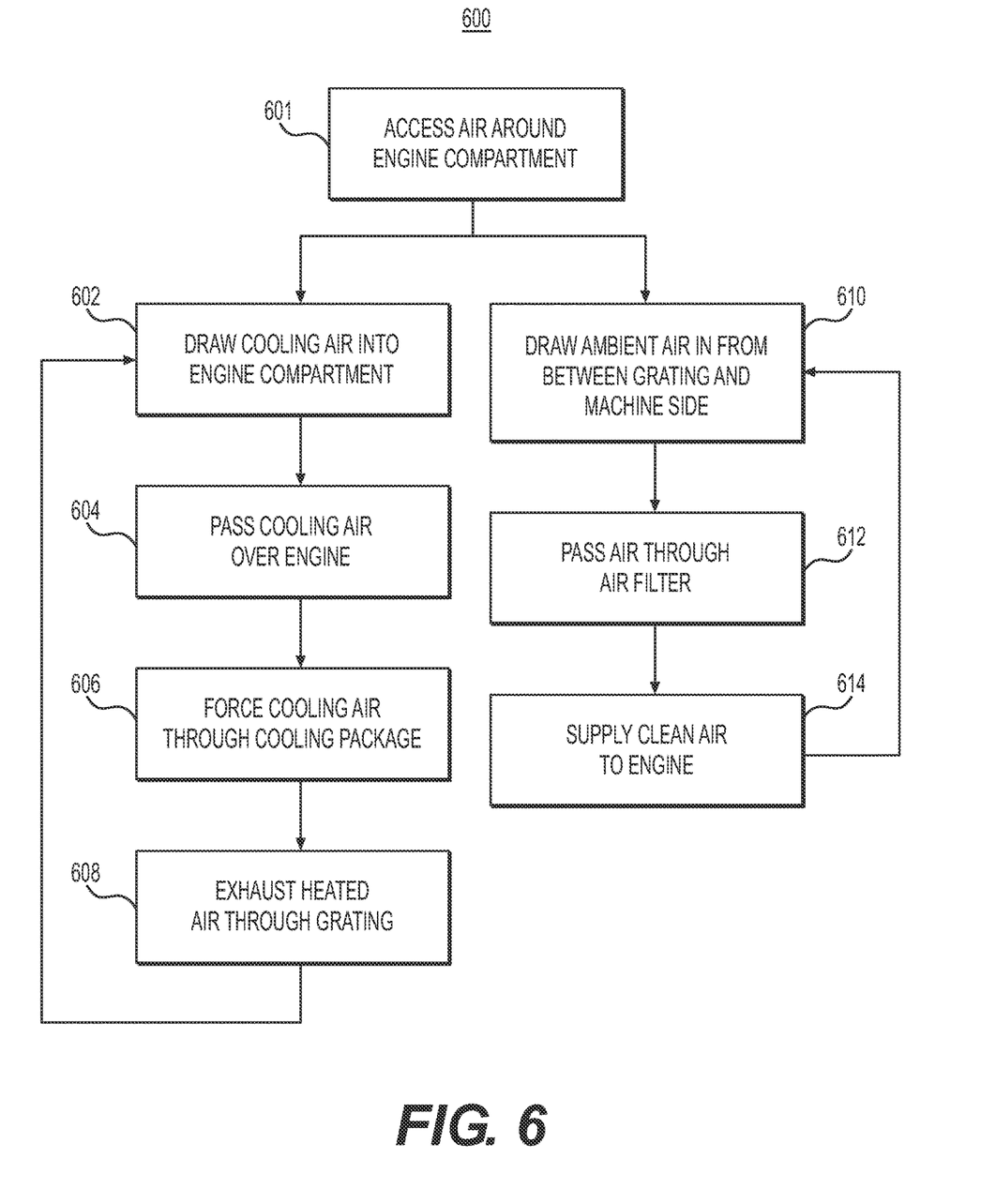
FIG. 6 is a flow chart depicting a method of operating an internal combustion engine of a compact loader in accordance with an example of the present disclosure.

Turning from the structure of work machine 100 as illustrated in FIGS. 1-5 to a method for operating engine 200, FIG. 6 is a flowchart of a representative method for a compact loader such as work machine 100. Generally embodied as 600 in FIG. 6, the method begins with a step 601 of generally accessing air in the atmosphere around an engine compartment of work machine 100. As discussed in detail above, ambient air surrounding work machine 100 is accessed both for cooling engine 200 as it runs and for feeding engine 200 with oxygen for combustion. The characteristics of the ambient air surrounding engine compartment 124 varies, however. As shown in FIG. 6, the process flowing from step 601 divides into two airflows for machine 100.

In a first flow of air depicted on the left side of FIG. 6, air is taken in from the atmosphere and used for cooling engine 200. This cooling flow begins with step 602 of drawing cooling air into an engine compartment, typically in a rear of a mobile machine. As elaborated above, cooling airflow 204 may be drawn into a machine such as 100 through grille 126 due to the action of a fan within a cooling package 202. In a second step of method 600 for the cooling flow, a step 604 for operating engine 200 entails passing cooling airflow 204 over the internal combustion engine to form heated airflow 206. In the examples of FIGS. 1-5, a coolant system for engine 200, including cooling package 202, directs cooling airflow 204 over one or more heat exchangers and affiliated components to extract heat from engine 200. As indicated in step 606 of FIG. 6, the cooling airflow 204 is forced through a cooler, such as cooling package 202. The extracted heat is absorbed by cooling airflow 204, converting it into heated airflow 206. In step 608, the heated air from the mobile machine is exhausted through a vent of the engine compartment. Specifically, in the illustrated example, heated airflow 206 escapes from engine compartment 124 through grating or cooling vent 208, which is on a top side 110 of work machine 100 different from rear side 112 where cooling airflow 204 enters engine compartment 124. This cooling flow continues, with the method 600 returning from step 608 to step 602 for drawing cooling air into engine compartment 124.

In a second flow of air depicted on the right side of FIG. 6, air is taken in from the atmosphere and used for combustion by engine 200. This combustion flow begins with step 610 where ambient air is drawn into the internal combustion engine via a directional intake apparatus. The directional intake apparatus, such as directional cap 220, includes an opening 226 positioned facing a location for taking in the ambient air. The position of opening 226 is offset laterally from cooling vent 208 with respect to a longitudinal centerline of the machine. Specifically, the position is between cooling vent 208 and another side of the mobile machine, such as side outer surface 314, different from top side 110 where heated airflow 206 exits. As part of the air intake, directional intake apparatus may block air ingress into engine 200 other than through opening 226. Accordingly, recirculation of air from the cooling flow, namely heated airflow 206, into the combustion flow is avoided or at least kept to a minimum. Moreover, a negative pressure may be imparted at or near opening 226, which may be caused at least in part by the exhausting of heated airflow 206 through cooling vent 208 and may assist in removing particulates from entering directional intake apparatus as part of the combustion flow. Following step 610, the combustion flow continues by passing air through an air filter in step 612 where particulates are removed. Finally, the clean air from the intake process is passed in step 614 from the air filter to the engine for combustion. This combustion flow continues, with the method 600 returning from step 614 to step 610 for drawing ambient air in from between the grating and a machine side.

It may be desirable to perform one or more of the step shown in FIG. 6 in an order different from that depicted. Furthermore, various steps could be performed at the same time, such as occurs during ongoing operation of engine 200.

Those of ordinary skill in the field will appreciate that the principles of this disclosure are not limited to the specific examples discussed or illustrated in the figures. For example, while the examples address cooling airflow 204 and heated airflow 206 as an airflow path entering from rear side 112 and exiting from top side 110 of work machine 100, the airflow path could be in the opposite direction. With cooling airflow 204 entering a top side 110 and heated airflow 206 exiting a rear side 112 of work machine 100, the positions of cooling vent 208 and grille 126 may be exchanged. Likewise, air intake assembly 212 could be installed on a rear side 112 of work machine 100 adjacent cooling vent 208, following the principles discussed above for decreasing the intake of particulates and avoiding high temperatures.

Similarly, the external structure of work machine 100 could be the same as illustrated but with a cooling fan internal to engine compartment 124 positioned vertically at a rear side 112 of work machine 100 rather than horizontally at a top side 110 of work machine 100. The vertical cooling fan could forcibly draw cooling airflow 204 through grille 126 at the rear side 112 rather than forcibly blow heated airflow 206 out cooling vent 208 at the top side 110. Other variations will be apparent to those skilled in the field.

INDUSTRIAL APPLICABILITY

The present disclosure provides a work machine having a directional air intake assembly and methods for operating an internal combustion engine with the directional air intake assembly. The directional air intake assembly may be used to select ambient air for combustion in a machine such as a compact loader that minimizes the presence of particulates and avoids high temperatures from heated air exhausted by the engine. As a result, the directional air intake assembly may improve the efficiency of the engine by decreasing its exposure to dirty and heated air. As well, the utility of the work machine may be increased because servicing of air cleaners, which can be time consuming and interruptive, can occur less frequently. In addition, air filters for the compact loader do not need to be changed as often, saving costs.

As noted above with respect to FIGS. 1-6, an example work machine 100 includes an internal combustion engine mounted within an engine compartment, a cooling vent 208 configured to eject air heated by the engine into atmosphere, and an intake pipe within the engine compartment. The intake pipe is configured to pass ambient air from a distal end into the engine for combustion. A directional intake cap 220 has sides enclosing an elongated cavity between an inlet opening, which is configured to take in the ambient air for the engine, and an outlet opening, which is coupled to the distal end of the intake pipe. The directional intake cap is rotationally oriented on the intake pipe in a position such that the inlet opening 226 is, with respect to a longitudinal axis of the machine, laterally over the top outer surface of the engine compartment and aside the cooling vent. In addition, at least one of the sides of the directional intake cap is between the elongated cavity and the heated air ejected upwardly by the cooling vent.

In examples of the present disclosure, the directional intake cap is also rotated at an angle with respect to the longitudinal axis of the machine. The directional intake cap is shaped around a central axis 230 passing through the elongated cavity and the inlet opening, and the central axis is positioned at the angle so the opening faces away from a heated airflow 206 exiting the compact loader. As a result, the placement and orientation of the directional intake cap takes advantage of negative air pressure caused by the upward flow of heated airflow 206, which removes particulates and debris from in front of opening 226. Orienting central axis 230 away from heated airflow 206 also helps avoid taking in air of elevated temperatures from heated airflow 206. At the same time, central axis 230 may be directed away from a side of work machine 100 to shield inlet opening 226 from an area where dirt and debris may be airborne. In some examples, a keyed coupling between the directional intake cap and the intake pipe sets the directional intake cap at a rotational angle such that central axis 230 is directed at a rear corner of work machine 100. Accordingly, cleaner air within an acceptable range from ambient temperature is fed into engine 200 compared with other locations on the compact loader or with intake devices other than a directional intake cap.

Operating a compact loader such as work machine 100 as illustrated in FIGS. 1-5, according to the method of FIG. 6, has been found to provide substantial improvement in the quality of air provided to engine 200 compared with prior arrangements. Work machine 100 was operated in the same environment performing the same tasks as a second machine having the same structure as work machine 100 except with air intake assembly 212 being replaced with a conventional air intake near the tracks or wheels of the loader. The air cleaners for each machine were extracted and weighed to determine the amount of particulate collected by each. The air filters removed from work machine 100 had approximately 90% less particulate by weight than the air filters removed from the conventional machine. In addition, the temperature of air at air cleaner 218 in work machine 100 was measured at about 4 degrees Celsius above the operating ambient temperature, which is within the regulated temperature increase above ambient permitted for engine 200.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine, comprising:
   a frame;
   an engine compartment located in a rear section of the frame with respect to a direction of forward travel for the machine, the engine compartment comprising a top outer surface, a side outer surface, and a rear outer surface of the machine;
   an internal combustion engine mounted within the engine compartment;
   a cooling vent within the top outer surface, the cooling vent being configured to eject heated air upwardly from the engine compartment into atmosphere;
   a boundary on the top outer surface of the engine compartment separating the cooling vent from a remainder of the top outer surface;
   an intake pipe at least partially within the engine compartment configured to pass ambient air from a distal end of the intake pipe into the engine; and
   a directional intake cap having sides enclosing an elongated cavity between an inlet opening and an outlet opening, the inlet opening being configured to take in the ambient air for the engine, the outlet opening being coupled to the distal end of the intake pipe, wherein the directional intake cap is rotationally oriented on the intake pipe in a position in the rear section of the frame such that:
      with respect to a longitudinal axis of the machine, the inlet opening is vertically over at least a portion of the top outer surface of the engine compartment and laterally aside the cooling vent between a portion of the boundary and the side outer surface of the engine compartment, and
      at least one of the sides of the directional intake cap is between the elongated cavity and the heated air ejected upwardly by the cooling vent.

2. The machine of claim 1, further comprising:
   an operator seat located in a central section of the machine with respect to the direction of forward travel for the machine; and
   a protective cage covering the operator seat, the protective cage being hinged to the frame and having a port on a back side enabling rearward visibility from the operator seat, wherein
      the intake pipe passes through the top outer surface of the engine compartment between the protective cage and the cooling vent, and
      the distal end of the intake pipe is vertically above the top outer surface of the engine compartment.

3. The machine of claim 2, further comprising an exhaust stack having an outlet exposed to the atmosphere, wherein:
   the exhaust stack passes through the top outer surface of the engine compartment between the protective cage and the cooling vent, and
   the exhaust extends vertically above the top outer surface of the engine compartment.

4. The machine of claim 1, wherein, based at least in part on the position, the at least one of the sides of the directional intake cap blocks at least a portion of the heated air ejected upwardly by the cooling vent from entering the opening.

5. The machine of claim 1, wherein, based at least in part on the position, the directional intake cap blocks the ambient air from entering into the directional intake cap other than through the opening.

6. The machine of claim 1, wherein, based at least in part on the position, another of the sides of the directional intake cap is between the elongated cavity and the side outer surface of the machine.

7. The machine of claim 1, wherein a portion of the directional intake cap is shaped around a central axis passing through the elongated cavity and the intake opening, and, in the position, the central axis is substantially parallel with the top outer surface of the machine.

8. The machine of claim 7, further comprising at least one lift arm pivotally attached to a side of the frame, the at least one lift arm having an outermost surface, the outmost surface being within a side vertical plane extending from the machine substantially in parallel with the longitudinal axis of the machine, wherein the rear outer surface of the engine compartment is within a rear vertical plane extending from the machine substantially orthogonal to the longitudinal axis, and wherein, in the position, the central axis of the directional intake cap intersects the rear vertical plane before intersecting the side vertical plane.

9. The machine of claim 1, wherein the directional intake cap and the intake pipe are connected by a keyed coupling affixing the directional intake cap in the position with respect to the intake pipe.

10. The machine of claim 9, wherein the keyed coupling comprises a slot formed in one of the distal end of the intake pipe and a neck of the directional intake cap and a mating flange formed in another of the distal end of the intake pipe and the neck of the directional intake cap.

11. A method for operating an internal combustion engine on a mobile machine, comprising:
   drawing cooling air into an engine compartment in the mobile machine, the engine compartment mounted in a rear of the mobile machine with respect to a direction of forward travel of the mobile machine, the engine compartment comprising two sidewalls disposed horizontally apart from and on opposing sides of a longitudinal centerline of the mobile machine;
   causing a transfer of heat from the internal combustion engine to form heated air;
   exhausting the heated air from the mobile machine through a grating situated within an exterior surface of the engine compartment between the two sidewalls;
   drawing ambient air for the internal combustion engine into an opening of a directional intake apparatus, the drawing into the opening occurring at a location on the rear of the mobile machine lateral to the longitudinal centerline between the grating and one of the sidewalls; and
   passing the ambient air through a passage in the exterior surface of the engine compartment at a longitudinal location in the mobile machine between a rear port of a cab and the grating and at a transverse location proximate to a side edge of the rear port, the rear port enabling rearward visibility for an operator within the cab.

12. The method of claim 11, further comprising blocking the ambient air, via the directional intake apparatus, from entering into the internal combustion engine other than into the opening of the directional intake apparatus.

13. The method of claim 11, further comprising imparting a negative pressure to the ambient air at at least a portion of a region over the grating, the negative pressure being caused at least in part by the exhausting the heated air through the grating.

14. A compact loader, comprising:
a cab configured to seat an operator;
a rear port enabling rearward visibility for an operator within the cab;
an internal combustion engine mounted rearward from the cab with respect to a direction of forward travel for the compact loader;
a cooling package comprising a grating within an outer surface of the compact loader exposed to atmosphere, the cooling package being configured to eject a flow of air heated by the engine upwardly through the grating into the atmosphere;
an air intake assembly located adjacent the cooling package and proximate to a side edge of the rear port, the air intake assembly configured to pass ambient air into the engine and comprising:
an inlet tube coupled to the engine and having a longitudinal location on the compact loader between the rear port and the grating; and
a directional cap, coupled to the inlet tube, comprising a substantially tubular elongated body having a front edge defining an orifice, the orifice being at a position transversely beside the grating on the outer surface of the compact loader, the substantially tubular elongated body surrounding a central axis passing through the orifice from the directional cap in a direction rearward from the cab.

15. The compact loader of claim 14, wherein the central axis passing through the orifice from the directional cap extends from a longitudinal axis of the machine toward a rear corner of the compact loader.

16. The compact loader of claim 15, further comprising an exhaust stack, wherein a longitudinal location of the exhaust stack on the compact loader is between the rear port and the grating.

17. The compact loader of claim 14, wherein the central axis passing through the orifice from the directional cap is angled away from the grating.

18. The compact loader of claim 14, wherein the directional cap comprises a neck and a head, the neck being coupled to the inlet tube, and the head projecting at an angle away from the neck.

19. The compact loader of claim 18, wherein the head and neck block ingress to the inlet tube other than from through the orifice of the directional cap.

20. The compact loader of claim 18, wherein the directional cap and the inlet tube are connected by a keyed coupling setting the central axis of the head at a predetermined angular position with respect to a vertical axis of the inlet tube.

* * * * *